(12) United States Patent
Lin

(10) Patent No.: US 9,300,911 B2
(45) Date of Patent: Mar. 29, 2016

(54) METHOD OF VIDEO CALL MODIFICATION

(71) Applicant: HON HAI PRECISION INDUSTRY CO., LTD., New Taipei (TW)

(72) Inventor: Jin-Hue Lin, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 14/486,507

(22) Filed: Sep. 15, 2014

(65) Prior Publication Data

US 2015/0350597 A1    Dec. 3, 2015

(30) Foreign Application Priority Data

Jun. 3, 2014 (TW) .................................. 103119204

(51) Int. Cl.
| | |
|---|---|
| *H04N 7/14* | (2006.01) |
| *H04N 21/41* | (2011.01) |
| *H04N 21/414* | (2011.01) |
| *H04N 21/436* | (2011.01) |

(52) U.S. Cl.
CPC ........... *H04N 7/147* (2013.01); *H04N 21/4126* (2013.01); *H04N 21/41407* (2013.01); *H04N 21/43615* (2013.01)

(58) Field of Classification Search
CPC ......... H04N 7/14; H04N 7/141; H04N 7/147; H04M 3/54; H04M 1/72519; H04M 1/206; H04M 1/7253

USPC ............................................. 348/14.01–14.16
See application file for complete search history.

(56) References Cited

U.S. PATENT DOCUMENTS

| | | | | |
|---|---|---|---|---|
| 8,830,295 | B2* | 9/2014 | Vivekanandan | H04M 3/567 348/14.01 |
| 2006/0172766 | A1* | 8/2006 | Kim | H04L 29/06027 455/553.1 |
| 2011/0296480 | A1 | 12/2011 | Kim et al. | |
| 2013/0219288 | A1* | 8/2013 | Rosenberg | H04M 3/54 715/748 |
| 2014/0092841 | A1* | 4/2014 | Lee | H04M 3/58 370/329 |

FOREIGN PATENT DOCUMENTS

| | | |
|---|---|---|
| CN | 101662639 A | 3/2010 |
| CN | 102647208 A | 8/2012 |

* cited by examiner

*Primary Examiner* — Melur Ramakrishnaiah
(74) *Attorney, Agent, or Firm* — Novak Druce Connolly Bove + Quigg LLP

(57) ABSTRACT

A mobile terminal communicates with a remote terminal via a video call. The mobile terminal searches for at least one peripheral smart television to acquire device information of the at least one television to establish a TV list, and selects a target television. The mobile terminal then negotiates with the remote terminal to change session description of the video call to make the remote terminal directly send media stream to the target television. The mobile terminal also controls the target television to acquire media stream of the video call and directly send media stream to the remote terminal.

14 Claims, 5 Drawing Sheets

METHOD OF VIDEO CALL MODIFICATION

CROSS-REFERENCE TO RELATED APPLICATIONS

This application claims priority to Taiwanese Patent Application No. 103119204 filed on Jun. 3, 2014 in the China Intellectual Property Office, the contents of which are incorporated by reference herein.

FIELD

Embodiments of the present disclosure generally relate to Internet communication, and more particularly to method of video call modifying, a mobile terminal and a smart television.

BACKGROUND

With the development of Internet and mobile communications, VoIP phone (Voice on Internet Protocol, VoIP) is becoming increasingly popular so that most existing smart phones can support VoIP video calls. However, in a particular embodiment, the display screen of most smart phones is often small.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
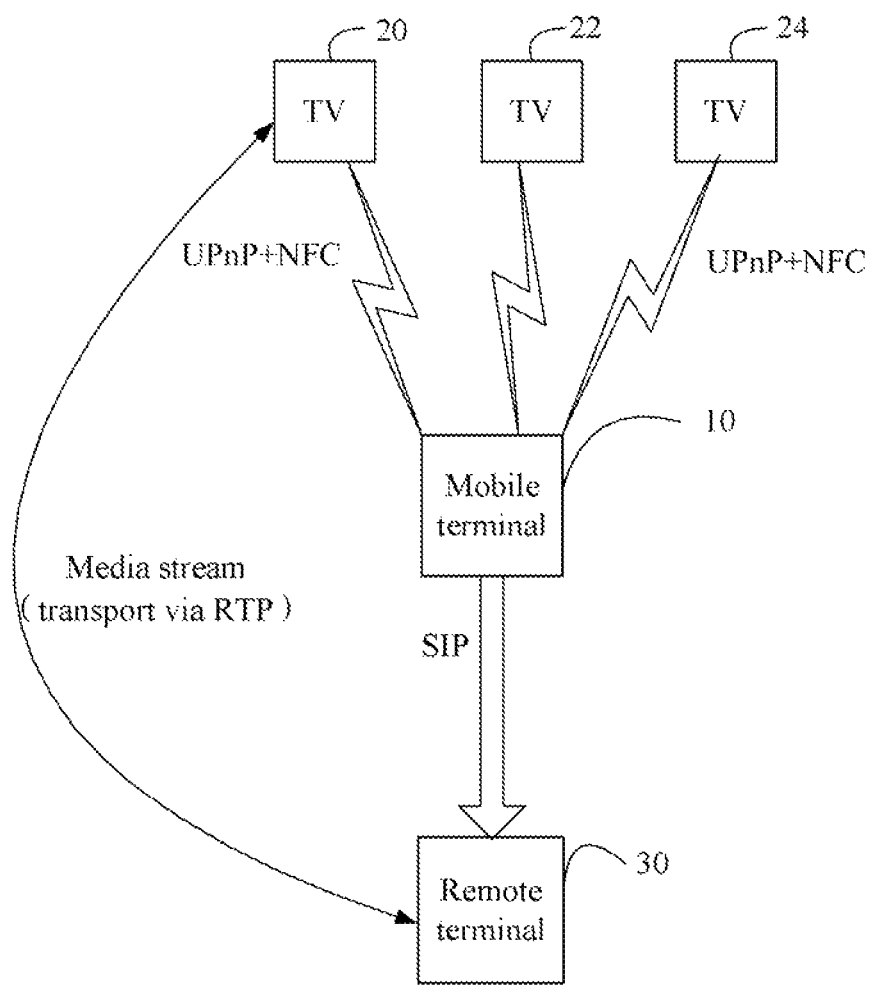
FIG. 1 is a diagrammatic view of an application environment of one embodiment of mobile terminal and smart television (TV) in accordance with the present disclosure.

The embodiments herein are illustrated by way of example and not by way of limitation in the figures of the accompanying drawings, in which like reference numerals indicate similar elements. It should be noted that references to "an" or "one" embodiment in this disclosure are not necessarily to the same embodiment, and such references mean "at least one."

In general, the word "module" as used hereinafter refers to logic embodied in hardware or firmware, or to a collection of software instructions written in a programming language such as, for example, Java, C, or assembly. One or more software instructions in the modules may be embedded in firmware such as in an erasable-programmable read-only memory (EPROM). Modules may comprise connected logic modules, such as gates and flip-flops, and may comprise programmable modules, such as programmable gate arrays or processors. The modules described herein may be implemented as either software and/or hardware modules and may be stored in any type of computer-readable medium or other computer storage device.

FIG. 1 is a diagrammatic view of an application environment of one embodiment of a mobile terminal and smart television. In embodiments of the present disclosure, mobile terminal 10 can communicate with a plurality of smart television such as TV 20, 22, 24, and so on, which is an example but not a limitation to the present disclosure. Mobile terminal 10 also communicates with remote terminal 30 via VoIP calls based on Session Initiation Protocol (SIP). In general, SIP is usually implemented together with Session Description Protocol (SDP) and Real-time Transport Protocol (RTP) in a VoIP call. In detail, mobile terminal 10 negotiates with remote terminal 30 via SIP and adopts SDP package as description of the session during SIP negotiation, meanwhile, all data during VoIP call is transferred via RTP protocol.

In embodiments of the present disclosure, remote terminal 30 may be fixed line terminals or any smart mobile terminal that supports VoIP, such as IP telephone. Mobile terminal 10 may be any smart mobile terminal that can supports VoIP calling, such as smart mobile phones. Both mobile terminal 10 and remote terminal 30 include 10 essential components for VoIP call such as SIP UA, etc. TV 20, 22, 24 can be any smart television with camera to acquire video, such as digital TV, digital set-top boxes, digital players, etc. In addition, the video call occurs between mobile terminal 10 and remote terminal 30 in embodiments of the present disclosure are all VoIP video call, for convenience hereinafter all "video call" refers to VoIP video call in the present disclosure.

In embodiments of the present disclosure, TV 20, 22, 24 and mobile terminal 10 are all devices that support Universal Plug and Play (UPnP) that can be called UPnP devices with the necessary components to achieve function of UPnP. Mobile terminal 10 can discover other UPnP devices in the same network such as TV 20, 22, 24 via Simple Services Discovery Protocol (SSDP), which is one of the core protocols of UPnP. In addition, mobile terminal 10 can get device information of TV 20, 22, 24 such as IP addresses and device capabilities via UPnP.

In embodiments of the present disclosure, TV 20, 22, 24 and mobile terminal 10 are also NFC devices that include NFC component. Mobile terminal 10 can communicate with TV 20, 22, 24 via NFC touch and induction.

In one embodiment of the present disclosure, when proceeding a video call with remote terminal 30, mobile terminal 10 searches surrounding TVs by sending M-search commands to TV 20 via SSDP to obtain the device information of TVs and establishes a TV list. Mobile terminal selects an appropriate TV to be a target TV from the TV list, such as TV 20. After negotiation with remote terminal 30, mobile terminal 10 changes the destination address of media stream of remote terminal 30 to IP address of TV 20. Thereafter, the media stream is directly transported between remote 30 and TV 20 while conduction of the video still maintained by mobile terminal 10 controls the video call.

Figure 2:
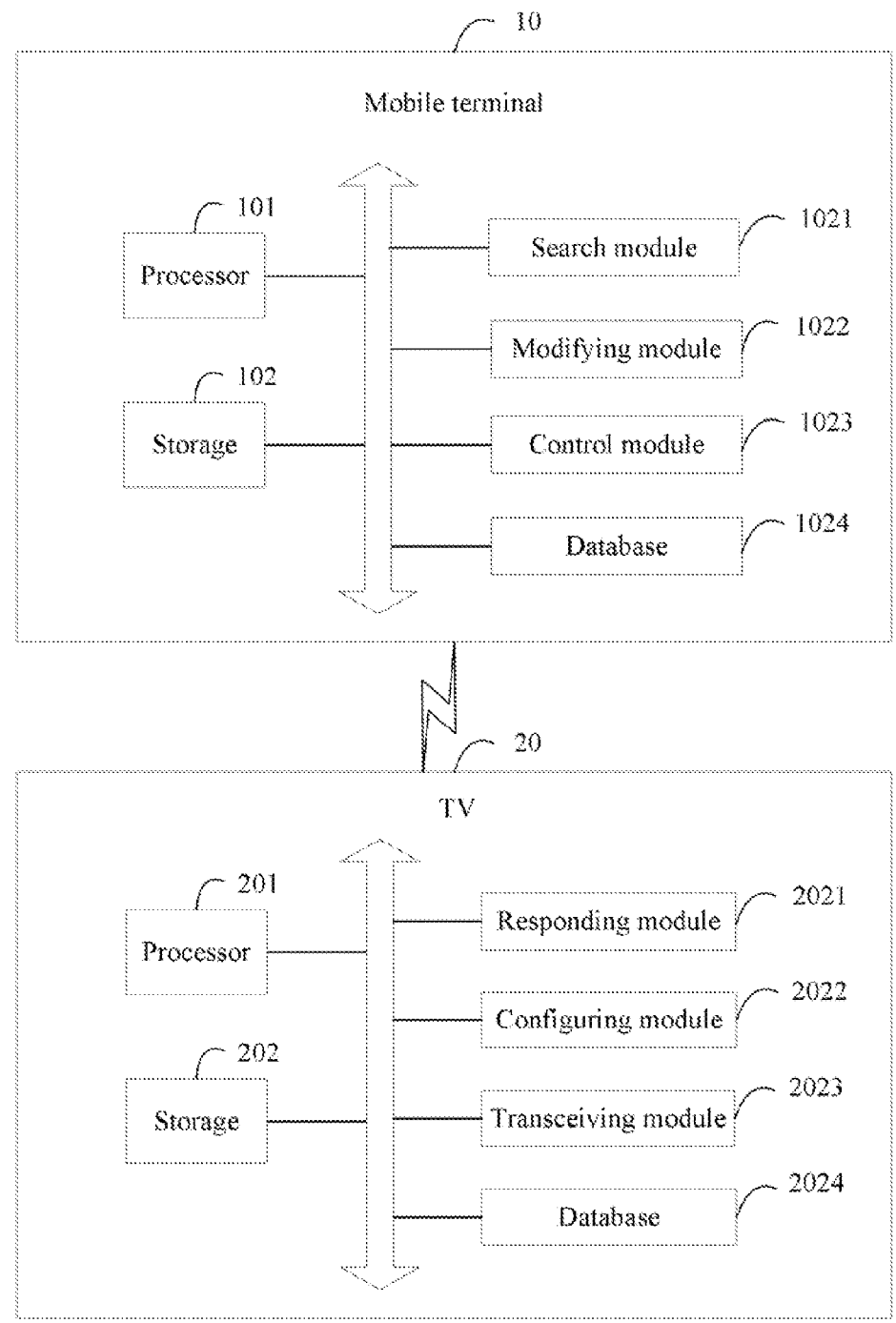
FIG. 2 is a block diagram of functional modules of the mobile terminal and TV in FIG. 1.

FIG. 2 is a block diagram of functional modules of mobile terminal 10 and TV 20 in FIG. 1. Only TV 20 is described as on behalf of all TV here because TV 20, 22, 24 are the same smart television with the same functional modules. In addition, hereafter TV is adopted when a target TV is needed. Mobile terminal 10 includes a search module 1021, a modifying module 1022, a control module 1023, a database 1024, a storage system 102, and at least one processor 101. In one embodiment, the modules 1021-1024 may comprise computerized code in the form of one or more programs that are stored in the storage system 102. The computerized code includes instructions that are executed by the at least one processor 101 to provide functions for the modules 1021-1024. TV 20 includes a responding module 2021, a configuring module 2022, a transceiving module 2023, a database 2024, a storage system 202, and at least one processor 201. In one embodiment, the modules 2021-2024 may comprise computerized code in the form of one or more programs that are stored in the storage system 202. The computerized code includes instructions that are executed by the at least one processor 201 to provide functions for the modules 1021-1024. In one example, the storage system 102 and 202 may include a hard disk drive, a flash memory, a cache or another computerized memory device.

The search module 1021 of mobile terminal 10 searches for peripheral TVs, such as TV 20, 22, 24, obtains device information of peripheral TVs to establish a TV list and finally determines a target after selection. Detail will be described hereafter. When a user makes mobile terminal 10 touch a TV to cause NFC induction during mobile terminal 10 having a video call with remote terminal 30, the search module 1021 obtains a NFC-UID (NFC tag) of the touched TV and enables function of UPnP of mobile terminal 10 to activate search function. The search module 1021 of mobile terminal 10 sends search commands of "M-search" to the persistent TVs including TV 20, 22, 24 via UPnP Discovery process. The persistent TVs will respond to M-search, taking TV 20 as an example, the responding module 2021 of TV 20 responds to the search module 1021 of mobile terminal 10 with device information of TV 20 after receiving M-search command. Thereby the search module 1021 of mobile terminal 10 obtains device information of each TV and establishes a TV list to store the device information. Then the search module 1021 of mobile terminal 10 selects a TV to be a target from the TV list according to requirement default by the user. In detail, device information of TV includes IP address of TV, NFC-UID of TV and device abilities of TV. In the present embodiment, the requirement default by the user is that the TV comprises UPnP components of AV-MediaRender (MR) and DigitalSecurityCamera (DSC) and some other UPnP services that are necessary such as MR-AVT (AV transport), MR-CM (connection manager) and DSC-MI (Motion Image). Any TV in the TV list that meets the default requirement is an optional TV and the NFC-UID will be store into an optional ID list. The search module 1021 of mobile terminal 10 automatically selects the touched TV automatically as a target TV if the NFC-UID of the touched TV is included in the optional ID list and makes a connection with the target TV. Otherwise, the user can select another TV to be the target TV by touching another TV using mobile terminal 10 until the TV touched is optional. Here, the choice of the target TV is implemented by NFC touch between TVs and mobile terminal 10, which avoids a call on hold during a call due to a selection operate on a user interface of mobile terminal 10 and brings good experience to the user. In other embodiments, the target TV can also be selected directly on a user interface that shows optional TVs, which is just an example but not as a limitation to the present disclosure.

The modifying module 1022 of mobile terminal 10 make remote terminal 30 change the transmission end of media stream of video call via SIP negotiation with remote terminal 30. The modifying module 1022 of mobile terminal 10 modifies the description of video call by sending a "SIP re-invite" request to remote terminal 30. In detail, the modifying module 1022 of mobile terminal 10 specifies the IP address of TV 20 (the target TV) as a destination address of media stream in the SDP package while keeping other description original such as the end of session data. After receiving the SDP package, remote terminal change configuration of session description according to the SDP package. In this case, for remote terminal 30, the one that it communicates with via a video call is still mobile terminal 10 because the SIP messages and other data for session control is still transported between remote terminal 30 and mobile terminal 30, but the media stream transmission has been diverted to TV 20. In other embodiments, the media stream may be video stream, audio stream or a mixture of video stream and audio stream, which depends on the user's selection and whether the target TV provide function of ACE that required for audio call. Meanwhile, the modifying module of mobile terminal 10 can obtain the default encoding/decoding mode of video call and the transport mode, which are also description of video call and will be shared to the target TV hereafter. In the present embodiment, the transport mode is defaulted to be RTP transmission.

The control module 1023 of mobile terminal 10 is used to inform TV 20 of the result of SIP negotiation via UPnP, to configure the IP address that TV 20 sends/media stream to/and controls the transceiving module 2023 to receive/send/play the media stream. The control module 1023 of mobile terminal 10 acquires the result of SIP negotiation that includes the IP address of remote terminal 30, the default encoding/decoding mode of video call and the default transport mode after the modifying module 1022 of mobile terminal 10 finishes SIP negotiation to make TV 20 as the destination end of the media stream of remote terminal 30. The control module 1023 of mobile terminal 10 sends UPnP control commands to the configuring module 2022 of TV 20 and the configuring module 2022 of TV 20 then initiates and expands configurations of relevant UPnP components and service according to the UPnP control commands received. For example, for the UPnP component AV-MR, the configuring module 2022 of TV 20 configures its media transport protocol as RTP, receiving address of media stream as the IP address of remote terminal 30, the supported encoding/decoding mode as the default encoding/decoding mode of video call and expands its ability of receiving media stream from a remote terminal. The initiation and expansion of other UPnP components and service, such as the DSC component, is similar with what is described above, which includes configures the destination address as the IP address of remote terminal 30, the supported encoding/decoding mode as the default encoding/decoding mode of video call, and so on. After the initialization and expansion is completed, the control module 1023 of mobile terminal 10 continuingly control the transceiving module 2023 of TV 20 to obtain media stream from remote terminal 30, to send media stream to remote terminal 30 via UPnP. Besides, the control module 1023 of mobile terminal 10 timely inform the transceiving module 2023 of TV 20 to modify/change the beginning/ending time of media stream sending/receiving/play, or to modify/change related properties of media play (such as brightness, color), according to the SIP messages received from remote terminal 30 during the video call.

Figure 3:
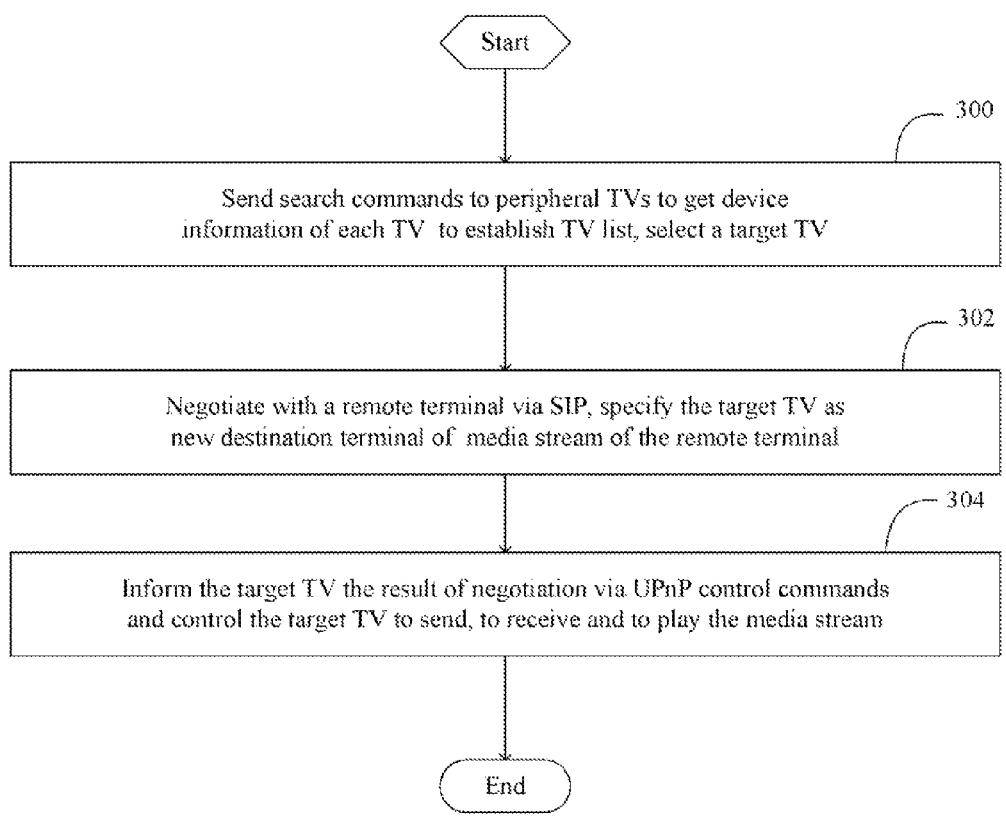
FIG. 3 is a flowchart of one embodiment of method of video call transfer executed by the mobile terminal.

FIG. 3, is a flowchart of one embodiment of a method of video call transfer executed by the mobile terminal. In one embodiment, the method functions in the application environment in FIG. 1 and is executed by the modules in FIG. 2 in the manner following. Hereafter taking mobile terminal 10 transfers the video call to TV 20 as an example to describe.

In block 300, during a video call proceeding with remote terminal 30, the search module 1021 obtains a NFC-UID (NFC tag) of a touched TV and enables function of UPnP of mobile terminal 10 to activate search function when a user makes mobile terminal 10 touch the touched TV to cause NFC induction. The search module 1021 of mobile terminal 10 sends search commands of M-search to the persistent TVs including TV 20, 22, 24 via UPnP Discovery process. The persistent TVs will respond to M-search, taking TV 20 as an example, the responding module 2021 of TV 20 responds to the search module 1021 of mobile terminal 10 with device information of TV 20 after receiving M-search command. Thereby the search module 1021 of mobile terminal 10 obtains device information of each TV and establishes a TV list to store the device information. Then the search module 1021 of mobile terminal 10 selects a TV to be a target from the TV list according to requirement default by the user and the comparison with the touched TV. In detail, device information of TV includes IP address of TV, NFC-UID of TV and device abilities of TV. In the present embodiment, the requirement default by the user is that the TV comprises UPnP components of AV-MR and DSC and some other UPnP services that are necessary such as MR-AVT, MR-CM and DSC-MI. Any TV in the TV list that meets the default requirement is an optional TV and the NFC-UID will be store into an optional ID list. The search module 1021 of mobile terminal 10 automatically selects the touched TV automatically as a target TV if the NFC-UID of the touched TV is included in the optional ID list and makes a connection with the target TV. Otherwise, the user can select another TV to be the target TV by touching another TV using mobile terminal 10 until the TV touched is optional. Here, the choice of the target TV is implemented by NFC touch between TVs and mobile terminal 10 that is determined by the user, which avoids a call on hold during a call due to a selection operate on a user interface of mobile terminal 10 and brings good experience to the user. In other embodiments, the target TV can also be selected directly on a user interface that shows optional TVs, which is just an example but not as a limitation to the present disclosure.

Figure 4:
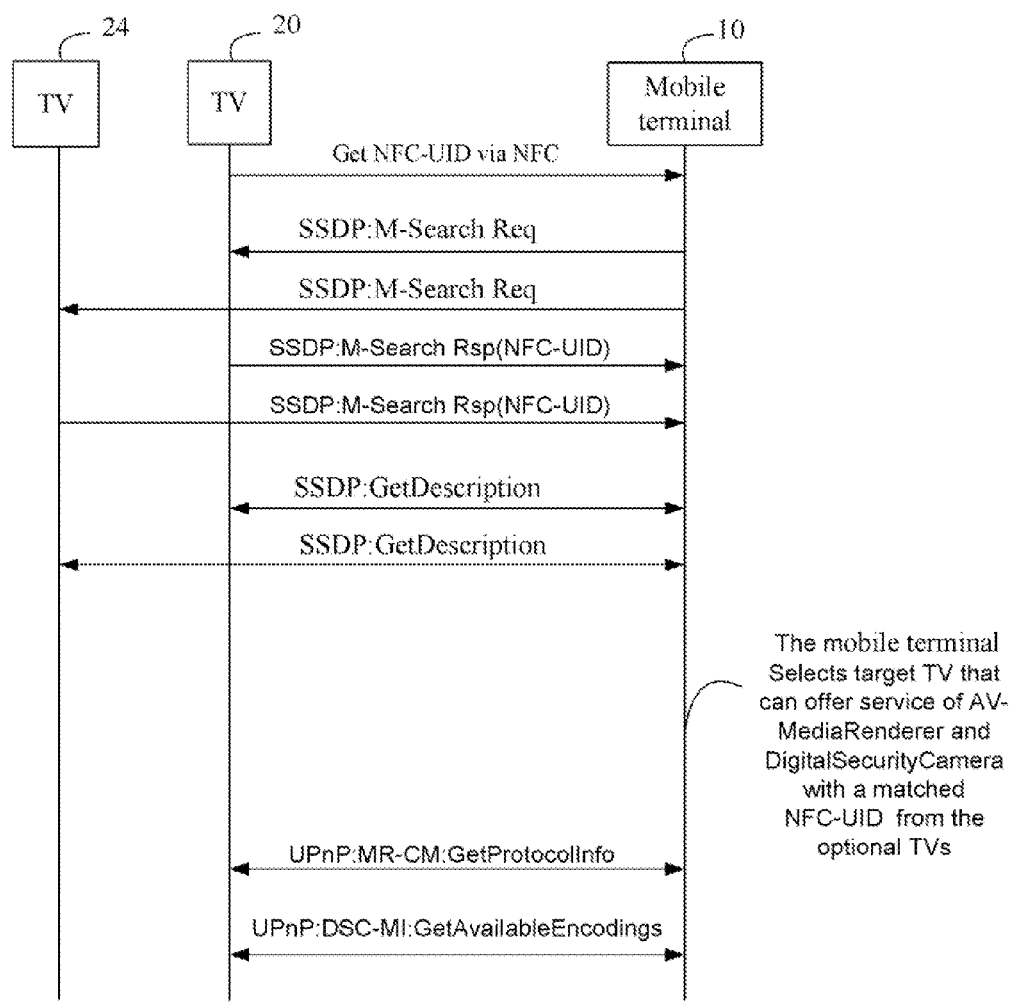
FIG. 4 is a diagrammatic view of one embodiment of communication between the mobile terminal and the TV when searching.

FIG. 4 is a diagrammatic view of one embodiment of communication between mobile terminal 10 and peripheral TVs when mobile terminal 10 is searching peripheral TVs. Besides, detail of commands of UPnP and SSDP will not be explained because both UPnP and SSDP are common protocol and any commands of UPnP and SSDP are obvious to a skilled artisan. In FIG. 4, "SSDP:M-Search Req" refers to command "M-Search Req" of SSDP, "UPnP:MR-CM:GetProtocalInfoming" refers to command "GetProtocalInfoming" of services of UPnP AV MR-CM, other commands hereafter are similar to these two. Hereafter assumes that mobile terminal 10 touches TV 20 (touched TV) and finally selects TV 20 as a target TV. Mobile terminal 10 obtains the NFC-UID of TV 20 and enables function of UPnP after a NFC induction with TV 20 via touching. Mobile TV 20 then sends peripheral TVs (only TV 20 and TV 40 shown in FIG. 3). The peripheral TVs respond with "M-Search Rep" command, reporting their NFC-UIDs. Mobile terminal 10 sends command of "GetDescription" to each TV to obtain device information of each TV and the search process ends after all device information of TVs are obtained by mobile terminal 10. Then mobile terminal 10 selects a TV with a matched NFC-UID with the touched TV that can meet the default requirement as a target TV (TV 20). Mobile terminal 10 then obtains device abilities including transport protocol and encoding/decoding mode of TV 20 via UPnP commands such as "GetProtocolInfo", and so on.

In block 302, the modifying module 1022 of mobile terminal modifies the description of video call by sending a "SIP re-invite" request to remote terminal 30. In detail, the modifying module 1022 of mobile terminal 10 specifies the IP address of TV 20 (target TV) as a destination address of media stream in the SDP package while keeping other description original such as the end of session data. After receiving the SDP package, remote terminal change configuration of session description according to the SDP package. In this case, for remote terminal 30, the one that it communicates with via a video call is still mobile terminal 10 because the SIP messages and other data for session control is still transported between remote terminal 30 and mobile terminal 30, but the media stream transmission has been diverted to TV 20. In other embodiments, the media stream may be video stream, audio stream or a mixture of video stream and audio stream, which depends on the user's selection and whether the target TV 10 provide function of ACE that is required for audio call. Meanwhile, the modifying module of mobile terminal 10 can obtain the default encoding/decoding mode of video call and the transport mode, which are also description of video call and will be shared to the target TV hereafter. In the present embodiment, the transport mode is defaulted to be RTP transmission.

In block 304, the control module 1023 of mobile terminal 10 acquires the result of SIP negotiation that includes the IP address of remote terminal 30, the default encoding/decoding mode of video call and the default transport mode after the modifying module 1022 of mobile terminal 10 finishes SIP negotiation to make TV 20 as the destination end of the media stream. The control module 1023 of mobile terminal 10 sends UPnP control commands to the configuring module 2022 of TV 20 and the configuring module 2022 of TV 20 then initiates and expands configurations of relevant UPnP components and services according to the UPnP control commands received. For example, for the UPnP component AV-MR, the configuring module 2022 of TV 20 configures its media transport protocol as RTP, receiving address of media stream as the IP address of remote terminal 30, the supported encoding/decoding mode as the default encoding/decoding mode of video call and expands its ability of receiving media stream from a remote terminal. The initiation and expansion of other UPnP components and service, such as the DSC component, is similar with what is described above, which includes configurations of the destination address as the IP address of remote terminal 30, the supported encoding/decoding mode as the default encoding/decoding mode of video call, and so on. After the initialization and expansion is completed, the control module 1023 of mobile terminal 10 continuously controls the transceiving module 2023 of TV 20 to obtain media stream from remote terminal 30, to send media stream to remote terminal 30 via UPnP. Besides, the control module 1023 of mobile terminal 10 timely informs the transceiving module 2023 of TV 20 to modify/change the beginning/ending time of media stream sending/receiving/play, or to modify/change related properties of media play (such as brightness, color), according to the SIP messages received from remote terminal 30 during the video call.

Figure 5:
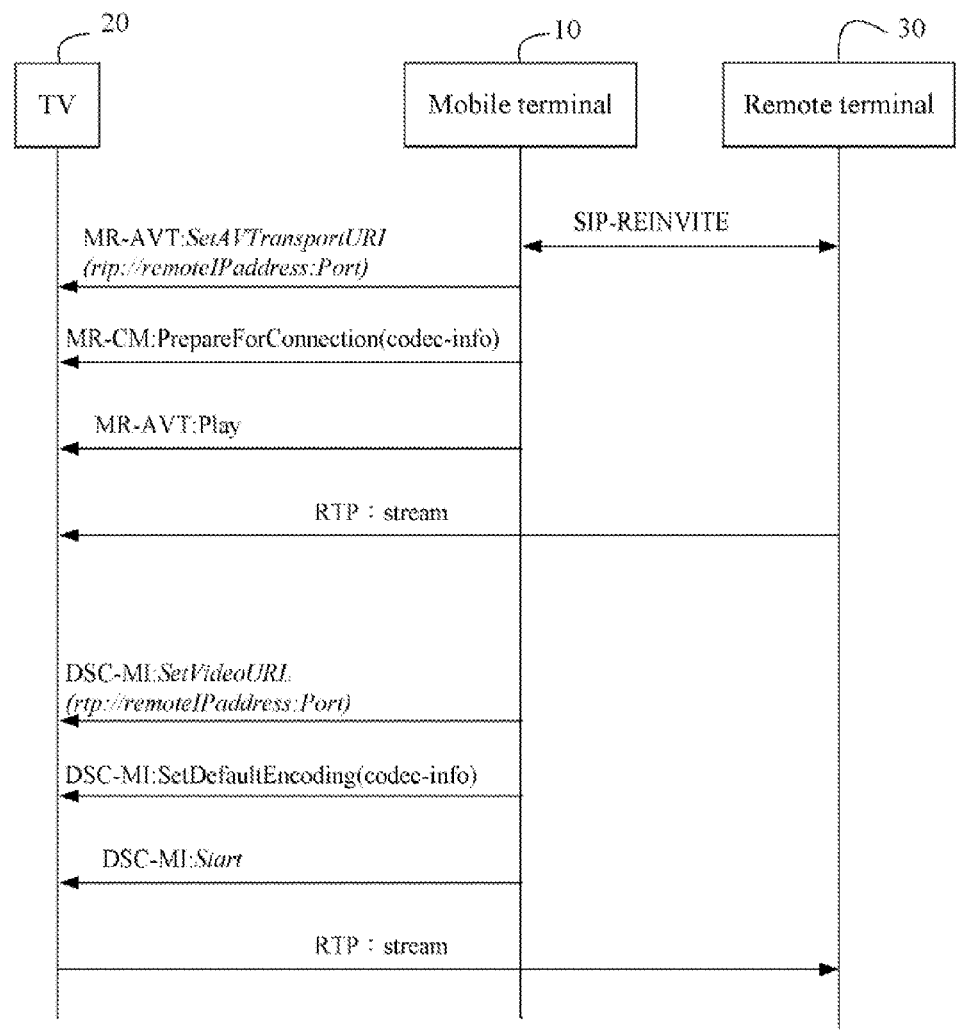
FIG. 5 is a diagrammatic view of one embodiment of commands exchange between devices when the mobile terminal controls the TV via UPnP.

FIG. 5 is a diagrammatic view of one embodiment of commands exchange between devices when the mobile terminal controls the TV via UPnP, commands that are shown in italics correspond to the expansion of relevant UPnP components. Mobile terminal 10 modifies the session description via SIP negotiation with remote terminal 30 by sending of "re-invite" and obtains corresponding information such as the IP address of remote terminal 30. When controlling TV 20 to receive media streams, mobile terminal 10 makes TV 20 configure relevant parameters, for example, the remote address to obtain media, the encoding/decoding mode, the transport mode and when to begin the transport, via commands of Set "AVTransport", "PrepareForConnectionde" and "Play", or other relevant commands. When controlling TV 20 to send media streams, commands that mobile terminal 10 use are similar to what is described when receiving media streams, the only difference is that different UPnP components and services are adopted.

In summary, the mobile terminal, the smart television and method of video call transfer in the present embodiment of the present disclosure transfer the media stream transport between the mobile terminal and the remote terminal to media stream transport between the smart television while keeping the session controlled by the mobile terminal via SIP negotiation and UPnP control, which decrease the burden of the mobile terminal and brings good experience to users.

While various embodiments and methods have been described above, it should be understood that they have been presented by way of example only and not by way of limitation. Thus, the breadth and scope of the present disclosure should not be limited by the above-described embodiments. The above-described embodiments are illustrative only, and should not be construed as limiting the following claims.

What is claimed is:

1. A mobile terminal comprising:
   at least one processor; and
   a nontransitory computer readable medium coupled to the processor, storing instructions that when executed by the processor, cause the processor to:
   communicate with a remote terminal via a video call, the remote terminal acquiring media stream data;
   search for at least one smart television to acquire device information of the smart television;
   establish a TV list;
   select a target television from the TV list;
   negotiate with the remote terminal to change a session description of the video call to set a destination address of the media stream data of the remote terminal as an IP address of the selected target television;
   instruct the remote terminal to send the media stream data directly to the target television;
   control the target television to acquire additional media stream data for the video call;
   control the target television to set a destination address of the media stream of the target television as an IP address of the remote terminal, thereby enabling the target television to send the media stream data directly to the remote terminal.

2. The mobile terminal of claim 1, wherein the searching for the at least one smart television surrounding the mobile terminal is implemented via Universal Plug and Play (UPnP), the negotiating with the remote terminal is implemented via Session Initiation Protocol (SIP), and the controlling the target television is implemented via UPnP.

3. The mobile terminal of claim 1, wherein the device information comprises an NFC tag, an IP address and device abilities of the at least one smart television.

4. The mobile terminal of claim 3, wherein the searching for the at least one smart television surrounding the mobile terminal is started upon condition that an NFC induction to a first smart television is detected.

5. The mobile terminal of claim 4, wherein the instructions further cause the processor to:
   distinguish each of the at least one smart television via the NFC tag;
   determine the at least one smart television to be optional televisions when the device abilities of the at least one smart television meet a default requirement that is preset by users; and
   automatically select the first smart television as the target television when the first smart television is one of the optional televisions.

6. A method for modifying video call, applied in a mobile terminal, the method comprising:
   communicating with a remote terminal via a video call, the remote terminal acquiring media stream data;
   searching for at least one smart television to acquire device information of the smart television;
   establishing a TV list;
   selecting a target television from the TV list;
   negotiating with the remote terminal to change a session description of the video call to set a destination address of the media stream data of the remote terminal as an IP address of the selected target television;
   instructing the remote terminal to send the media stream data directly to the target television;
   controlling the target television to acquire additional media stream data for the video call;
   controlling the target television to set a destination address of the media stream of the target television as an IP address of the remote terminal, thereby enabling the target television to send the media stream data directly to the remote terminal.

7. The method of claim 6, wherein the searching step is implemented via UPnP, the negotiating step is implemented via SIP, the controlling step is implemented via UPnP.

8. The method of claim 6, wherein the device information further comprises a NFC tag, a IP address and device abilities of the at least one smart television.

9. The method as described in claim 6, wherein the searching step is started upon condition that a NFC induction to a first smart television is detected.

10. The method as described in claim 6, further comprising:
    distinguishes each of the at least one smart television via the NFC tag;
    determining the at least one smart television to be optional televisions when the device abilities of the at least one smart television meet a default requirement that preset by users; and
    automatically selecting the first smart television as the target television when the first smart television is one of the optional televisions.

11. A smart television comprising:
    at least one processor;
    a storage system; and
    one or more programs that are stored in the storage system and are executed by the at least one processor, the one or more programs comprising instructions for:
    receiving searching commands from a mobile terminal;
    responding to the mobile terminal device information of the smart television after receiving searching commands from the mobile terminal;
    configuring a destination IP address of media stream of the smart television as a IP address of a remote terminal, according to the control commands from the mobile terminal;
    directly receiving media stream from the remote terminal; and
    directly sending media stream to the mobile terminal.

12. The smart television of claim 11, wherein the device information comprises a IP address and device abilities of the smart television.

13. The smart television of claim 11, wherein the device information further comprises a NFC tag when the smart television has a NFC component.

14. The smart television of claim 11, where the responding is further occurred upon condition that a NFC induction to the mobile terminal is detected.

\* \* \* \* \*